(12) United States Patent
Städtler et al.

(10) Patent No.: US 12,337,964 B2
(45) Date of Patent: Jun. 24, 2025

(54) PARAGLIDER CONTROLLER

(71) Applicant: ATLASAERO GmbH, Feldkirchen-Westerham (DE)

(72) Inventors: Jürgen Städtler, Feldkirchen-Westerham (DE); Marius Meißner, Brannenburg (DE)

(73) Assignee: ATLASAERO GmbH, Feldkirchen-Westerham (DE)

( * ) Notice: Subject to any disclaimer, the term of this patent is extended or adjusted under 35 U.S.C. 154(b) by 0 days.

(21) Appl. No.: 18/559,854

(22) PCT Filed: May 11, 2021

(86) PCT No.: PCT/EP2021/062542
§ 371 (c)(1),
(2) Date: Nov. 9, 2023

(87) PCT Pub. No.: WO2022/237971
PCT Pub. Date: Nov. 17, 2022

(65) Prior Publication Data
US 2024/0270383 A1    Aug. 15, 2024

(51) Int. Cl.
*B64C 31/036* (2006.01)
*G05D 1/2285* (2024.01)
*G05D 109/20* (2024.01)

(52) U.S. Cl.
CPC ........ *B64C 31/036* (2013.01); *G05D 1/2285* (2024.01); *G05D 2109/27* (2024.01)

(58) Field of Classification Search
CPC . B64C 31/036; G05D 1/2285; G05D 2109/27
See application file for complete search history.

(56) References Cited

U.S. PATENT DOCUMENTS

| 6,471,160 B2 | 10/2002 | Grieser |
| 2004/0153218 A1* | 8/2004 | Lohmiller ............... B64C 13/18 |
| | | 701/3 |

(Continued)

FOREIGN PATENT DOCUMENTS

| CN | 112173108 A | 1/2021 |
| CN | 212448081 U | 2/2021 |

(Continued)

OTHER PUBLICATIONS

Zumbado et al.; Hands-Free Control Interfaces for an Extra Vehicular Jetpack; 2013 IEEE Aerospace Conf., Big Sky, MT, USA, 2013; pp. 1-11 (Year: 2013).*

(Continued)

*Primary Examiner* — Michael J Zanelli
(74) *Attorney, Agent, or Firm* — Studebaker Brackett PLLC (57) ABSTRACT

A paraglider controller for controlling a paraglider drive, in particular an electric ascent aid, for a paraglider. The paraglider controller comprises a UI connection interface for sending and/or receiving user commands comprising a voice signal. Optionally, the ascent aid control further comprises a flight data interface for receiving flight data. Furthermore, the ascent aid control comprises an evaluation unit for evaluating received user commands and optionally flight data, wherein a user signal is output via the UI connection interface and/or a control signal is output via a control interface. An input and/or an output of user commands is thereby carried out using the UI connection interface by means of the speech signal.

14 Claims, 4 Drawing Sheets

(56) References Cited

U.S. PATENT DOCUMENTS

| | | | |
|---|---|---|---|
| 2004/0245409 A1 | 12/2004 | Cordina et al. | |
| 2008/0201148 A1* | 8/2008 | Desrochers | G10L 15/183 |
| | | | 704/E15.044 |
| 2013/0009013 A1 | 1/2013 | Bourakov et al. | |
| 2013/0009014 A1* | 1/2013 | Bordetsky | H04B 7/18504 |
| | | | 370/328 |

FOREIGN PATENT DOCUMENTS

| | | |
|---|---|---|
| DE | 101 50 168 A1 | 4/2003 |
| KR | 10-2035009 * | 10/2019 |
| RU | 2 647 801 C2 | 3/2018 |

OTHER PUBLICATIONS

Carolin Köhler et al.; "AR Training for Paragliding Pilots: An Investigation of User Experience and Requirements"; 2019 21st Symposium on Virtual and Augmented Reality (SVR); IEEE; Oct. 28, 2019; XP033645080 [found on Feb. 3, 2019]; DOI: 10.1109/SVR.2019.00030; p. 97, paragraph 2) Controls; p. 9, paragraph 7) Audio; p. 97, paragraph 5) Powering; p. 97, paragraph 9) Connectivity; pp. 92-101.

Anonymous; "NOVA introduces network and autonomous flying"; Apr. 1, 2019; XP055880553; found via Internet: URL:https://www.k-g-k.com/en/nova_paracontroller/ [found on Jan. 18, 2022]; the whole document; pp. 1-6.

International Search Report issued in PCT/EP2021/062542; mailed Jan. 28, 2022.

* cited by examiner

PARAGLIDER CONTROLLER

CROSS-REFERENCE TO RELATED APPLICATIONS

The present application is a National Stage Application under 35 U.S.C. § 371 of International Application No. PCT/EP2021/062542 filed on May 11, 2021, the disclosure of which is herein incorporated by reference in its entirety.

BACKGROUND

1. Field

The invention relates to a paraglider controller for controlling a paraglider drive, in particular an electric ascent aid, for a paraglider and a method for controlling the paraglider drive.

2. Description of Related Art

Electric ascent aids for paragliders make it possible for a pilot to take off with a paraglider on foot or by roll launch even in flat terrain and then to remain in the air for a longer period of time in flight without dynamic updrafts or thermals, e.g. to find a connection to a thermal or an updraft band. For this purpose, electric ascent aids have, for example, an electric drive or a motor with a rotor, power electronics for generating the electric rotating field, rechargeable batteries, a microprocessor and a handle for thrust control. For the control of the paraglider during take-off and if necessary during the flight, the pilot needs both hands to be able to execute two-handed control impulses. In addition, however, the pilot must also control the electric ascent aid, more precisely thrust and/or alignment of the motor or rotor, which are usually arranged for safety reasons at a distance in the direction of flight behind the pilot, in particular outside the pilot's arm's reach, or in a protective cage.

In practice in the area of motor paragliders, only mechanical or electronic control systems, in particular manual control units, are usually known for controlling such an electrically operated drive system with rotor. These control systems can be designed as mentioned, e.g. as a lever or throttle or similar, which the pilot must operate manually in parallel to the control of the paraglider. In principle, this type of simultaneous manual control of the paraglider and the electric ascent aid during take-off is possible, but it is associated with an increased risk to the pilot's safety. It generally complicates the launch or take-off procedure, as several functions have to be controlled simultaneously with the components attached to the hands and it is often necessary to reach over to other lines or to switch to them. Especially for inexperienced beginner pilots who want to learn powered paragliding, this means having to learn a more complex control system based on multitasking.

SUMMARY

It is therefore an object of the present invention to provide a means of controlling an electric ascent aid or paraglider drive more easily, in particular without using the hands.

This object is solved by a paraglider controller according to patent claim 1 and a method for controlling a paraglider drive according to patent claim 13.

The aforementioned paraglider controller is used for—preferably acoustic—control of a paraglider drive for a paraglider. Paraglider drives within the context of the invention include ascent aids and other drives, such as motors for UL motor paragliders, or alternative drives, e.g. jet-based. In particular, however, the paraglider controller is used to control an ascent aid. In the following, the terms "ascent aid controller" and "paraglider controller" as well as "ascent aid" and "paraglider drive" are therefore used essentially synonymously. The ascent aid controller comprises a UI connection interface for sending and/or receiving user commands comprising one or more voice signal(s). Optionally, it further comprises a flight data interface for receiving flight data. Furthermore, the ascent aid controller comprises an evaluation unit for evaluating received user commands and optionally flight data. Thereby, a user signal is output via the UI connection interface and/or a control signal is output via a control interface. An input and/or an output of user commands involves using the UI connection interface by means of the voice signal.

A paraglider is a foot-launched aerial sports device for paragliding. It includes a canopy, lines and risers. The canopy or wing is usually approximately elliptical and made of nylon fabric. It usually comprises an upper and lower sail and is divided into numerous cells extending in the direction of flight. It has two canopy ends, i.e. two wingtips, which form the lateral termination of the wing. Usually, line cascades run down from the underside of the sail in several levels, which are joined together to form a lower line cascade. The lower line cascade is in turn hooked into mallions and are connected to the respective left and right riser. In addition, a harness for the pilot is required for paragliding. The paraglider is connected to the pilot's harness via the risers, also called webbing, by means of carabiners.

This means that the load carried by the paraglider is attached to the risers by means of the carabiners. The load therefore refers to the total weight hanging from the paraglider. In addition to the pilot, the load also includes, for example, an ascent aid, i.e. motor and a boom. For example, the engine can be arranged behind the pilot in the direction of flight by means of the boom or push rods.

The UI interface is used to send and/or receive user commands, such as input from a user to the ascent aid controller or useful and/or warning output or instructions from the ascent aid controller to the user. Typically, the user is an individual pilot. However, user commands may also originate from users other than the pilot, for example entered by a co-pilot during a tandem flight. Preferably, user commands may also be received or sent by a user supervising the flight, such as a flight controller or flight instructor.

Such user commands comprise, but are not limited to, a speech signal. Spoken language or the underlying speech signal can mean, for example, an automatic speech output and/or an input of speech elements or words. The speech signal can also be analogue or digital and can be transmitted.

The evaluation unit evaluates received user commands. The evaluation unit can, for example, be designed on a microprocessor.

If, in addition, so-called flight data are received or recorded, the evaluation unit can preferably also evaluate these and, for example, combine them into a flight state. The flight data includes various measurement data that are recorded by means of corresponding sensors or a sensor arrangement. Such sensors can be, for example, a number of distance sensors, in particular ultrasonic sensors, acceleration sensors, gyroscopes, magnetometers, barometers and/or GPS sensors. Likewise, flight data may also include data from a LIDAR sensor.

The flight data includes at least the current sensor data. In addition, previous sensor data are preferably also included as flight history in order to include a development of the flight situation or the flight state.

For example, the sensors can therefore be combined in sensor units, which are arranged in particular at the ends of the wing tips and/or in the area of the load, e.g. one or more IMU (Inertial Measurement Unit). Several such individual sensors or sensor units together form a sensor arrangement. The sensors may be connected to the flight data interface individually or as such a sensor arrangement.

The flight data collected by means of the sensors can optionally be received via a flight data interface.

After the evaluation of the recorded data, a user signal is then output via the UI connection interface. The user signal can be emitted acoustically or visually, for example. In the simplest case, such a user signal can be, for example, a warning or indicating sound signal or light signal or flashing signal. However, in principle, a user signal can be of any complexity. In particular, individual words or even sentences can be output, which, for example, comprise several flight data strung together. In addition, it can contain essentially any flight state information, on the flight state of the paraglider or also instructions for the user. Flight state information can be, for example, the general flight condition parameter, the stability parameter for the canopy, the categorization of the current flight maneuver or the current dangerous situation or the like.

In addition or alternatively, a control interface outputs a control signal to the ascent aid, e.g. if the user command contains a control signal. Such control data or control signals contain, for example, control information, i.e. e.g. values and parameters for the thrust, the orientation of the drive or motor of the ascent aid. In the intended use, for example, a control unit is connected to the drive of the ascent aid in such a way that it can transmit control signals to the drive and execute them by means of the drive.

The above-mentioned input and/or output of user commands—that is, e.g. control instructions or control signals or status queries or user signals—is carried out according to the invention using the UI connection interface by means of the above-mentioned voice signal.

The device according to the invention described above enables a user to control the electric ascent aid by voice. Advantageously, the pilot has access to the ascent aid controller of the ascent aid at any time, independent of other momentary activities to be carried out with his limbs for the actual control of the paraglider, by giving precise or concise commands by voice.

By using an ascent aid controller according to the invention for controlling an electric ascent aid for a paraglider, an input and/or an output of user commands or user signals can be performed using a UI connection interface by means of a voice signal.

A method according to the invention for controlling an electric ascent aid for a paraglider with a UI connection interface, preferably for input and/or output means, a control unit and an evaluation unit, comprises at least the following steps:

Firstly, the UI connection interface sends and/or receives user commands comprising at least a voice signal.

Secondly, the evaluation unit evaluates correspondingly received user commands.

Finally, a user signal is output via the UI connection interface and/or a control signal is output via the control interface to the ascent aid. Thereby, user commands are input and/or output using the UI connection interface by means of the voice signal.

In the described method for controlling the ascent aid, a number of additional process steps may be provided. Optionally, a flight data interface of the ascent aid controller receives flight data, at least when flight data is provided or generated. Then the evaluation unit preferably evaluates in addition to the received user commands also the flight data, receiving the flight data particularly preferably via the flight data interface. The user signal and/or the control signal are determined using the result of the evaluation of the flight data.

An ascent aid control, in particular according to the invention, which has a UI connection interface, a flight data interface and an evaluation unit, can be designed in such a way that the evaluation unit comprises an analysis unit for analyzing a flight state. In addition to the above-mentioned UI connection interface for sending and/or receiving user commands and the flight data interface for receiving flight data, the analysis unit, which is preferably pretrained by means of a machine learning procedure, can analyze the data that the evaluation unit receives and evaluates in such a way that it determines a current flight state and, particularly preferably, a prediction of a future flight state. With this, a user signal, i.e. in particular the current flight state or the prediction of a future flight state can then be output via the UI connection interface and/or a control signal can be output to the ascent aid via a control interface based on the flight state.

The "flight state" can usually be determined from the interaction of a plurality of input parameters, which according to the invention comprise the first distance and/or at least a second distance. Further parameters will be explained in detail later, they comprise for example—for one or more axis—a position, a speed, an acceleration, an angular position, an angular velocity and/or an angular acceleration of the paraglider or individual components thereof as well as e.g. a flight altitude, a flight altitude change, an average wind speed, a dynamic pressure in the canopy cells or the like.

The flight state is determined by means of the evaluation unit. This means that the evaluation unit combines, for example, the previously recorded values of individual input parameters into output parameters that are relevant for the pilot and characteristic of the flight state, and outputs their values. Examples of output parameters are a general flight state parameter, which combines all input parameters into a value characteristic of the current and/or future flight situation, or a stability parameter for the canopy, which indicates whether the canopy is in a stable condition or, for example, in the process of collapsing. However, depending on the application, the flight state can also be characterized by a vector of individual output parameters. In particular, when using an AI-based method for evaluating the input parameters, an abstract parameter or vector of parameters can also be determined as the flight state, which e.g. enables a categorization of the flight state into conventional maneuvers, aerobatic maneuvers and/or dangerous situations.

Conventional flight maneuvers are, for example: control maneuvers such as pitch, roll, "fast figure eight", "circling in the upwind band", descent aids such as spiral dive, "big ears" or "B-stall". Aerobatic maneuvers are e.g. "helicopter", "SAT" or "(infinity) tumbling". Dangerous situations are e.g.: a complete or unilateral stall ("Stall"), an accelerated or unaccelerated lateral deformation ("Flap"), a frontal deformation ("Front Stall") as well as a permanent deformation ("Cravat"). The transition between aerobatics and dangerous situations is fluid.

The flight state is thus described by output parameters which, compared to the input parameters, enable a faster and simpler recording and evaluation of the actual flight situation. The evaluation can be carried out by the pilot, by a flight instructor or, for example, computer-based.

The flight data include at least the current sensor data. In addition, previous sensor data are preferably also included as flight history in order to include a development of the flight situation or the flight state. The flight data comprise, for example, completely or a part of measured values for the above-mentioned input parameters. The flight state system described here for predicting a future flight state of the paraglider represents an independent idea in itself. However, special synergetic effects result when combined with the previously described flight state system. In particular, the flight state can be determined as described above, be encompassed by the flight data and be included in the prediction.

Preferably, the analysis unit comprises a trained AI-based method. The term AI-based method means a machine method that mimics cognitive functions associated with the human mind. The term includes, for example, simple machine learning and deep machine learning. "Simple" or "traditional" machine learning methods include, for example, logistic regression, support vector machine (SVM), random forest or the like. In particular, by training based on training data, the trained AI-based method is able to adapt to new conditions and recognize and extrapolate patterns. In particular, supervised training, semi-supervised training, unsupervised training, reinforcement learning and/or active learning may be used. Further, the parameters of the trained AI-based method can be iteratively adjusted through multiple training steps.

Particularly preferably, the trained AI-based method may be a deep machine learning method, most preferably a neural network. In particular, the neural network may comprise a deep neural network, a foldable neural network or a foldable deep neural network.

The neural network has a known basic architecture. However, its inner structure is individually shaped by the training. The training thus defines the inner "structure" of the neural network and distinguishes it from other trained neural networks (even with the same basic architecture).

Within its training phase, the weights or parameters within its structure are automatically adjusted to resemble the training data. For the optimization of the weights/parameters of all layers, known optimization approaches, e.g. a gradient descent algorithm or an Adam algorithm in combination with e.g. the cross entropy loss function, can be used.

The input data (input vector) for the neural network comprise measured values of the above-mentioned sensors. Depending on the application or concrete design of the neural network, either measurement data of all sensors or only the measurement data of a part of the sensors can be used. The measured values of only one point in time can be included; however, a temporal course of the measured values from a defined time interval can also be combined as an input vector.

The training data include the input data or input vectors and associated annotations by experienced pilots. For example, the pilots can create annotations for their own flight or, for example, annotate the flight state accordingly using additionally recorded video sequences. As described above, the flight state can be annotated with regard to output parameters such as a general flight state parameter (general evaluation of the flight situation under safety aspects) e.g. using a freely selectable scale, stability parameters for the canopy e.g. using a freely selectable scale, a categorization of the flight condition into defined conventional maneuvers, aerobatic maneuvers and/or defined dangerous situations or the like.

While the readings of the sensors for the training data in relation to the conventional maneuvers can also be recorded during normal paragliding, the readings of the sensors for the training data in relation to the dangerous situations can be recorded in a safe environment (e.g. over water with water rescue present) by experienced pilots by means of specifically initiated dangerous situations.

After training, the weights/parameters of the network are adapted to the specific task and can, for example, evaluate flight situations with regard to safety and/or the canopy with regard to its stability and/or recognize the current maneuvers or dangerous situations.

Based on the data described above, patterns can be recognized in the measured values of the sensors or in the input data that occur shortly before a dangerous situation. Accordingly, a prediction of a future flight state can be made, preferably using a trained AI-based method, particularly preferably using a neural network.

The individual adverse flight states, dangerous situations or their preceding patterns can be assigned typical countermeasures, such as weight shift, counter-steering, braking or the like, which help the pilot to avoid the dangerous situation and/or improve the flight state.

Accordingly, the flight state system preferably comprises acoustic and/or visual output means for outputting the flight state and/or an instruction based on the flight state and/or a prediction.

By analysing the flight state, preferably "live" or in real time, it can be ensured that the pilot is supported even more extensively. For example, the pilot can be informed of a critical flight state directly by the ascent aid controller with the aid of warnings, so that he can normalize the flight state at an early stage, e.g. by appropriate corrective flight maneuvers. In addition, the pilot can receive user signals from the ascent aid controller with instructions for improving the current flight situation. Alternatively or additionally, control signals can also be issued directly by the control unit, so that an improvement of the flight condition can be achieved with the help of the drive of the ascent aid, among other means. In the event of a critical flight state, the ascent aid control can advantageously also directly trigger the rescue parachute for the pilot and at the same time separate the pilot from the other components of the ascent aid, if necessary.

Such an ascent aid controller is therefore also advantageous independently of the previously described ascent aid controller and represents an independent idea. However, special synergetic effects result from a combination of the two ideas. In this way, an electric ascent aid can be controlled particularly safely by voice by integrating the current flight state. The current flight state can therefore be taken into account in real time during control.

A paraglider according to the invention comprises at least one electrically operated ascent aid and an ascent aid controller according to the invention. The ascent aid may have at least one electric drive or electric motor. Such a motor—e.g. an electric backpack motor with or without a protective cage, in particular a brushless three-phase synchronous electric motor—may, for example, be connected to at least one rotor or a number of rotor blades.

However, other means of propulsion from the powered paraglider sector are also possible. For example, backpack engines—mostly with a two-stroke engine with a fuel tank and a propeller—can also be used.

The ascent aid controller according to the invention can advantageously be retrofitted to existing ascent aids. However, it is also possible to equip newly manufactured ascent aids with a ascent aid controller according to the invention during production.

The essential components of the ascent aid controller according to the invention, in particular the evaluation unit, can be predominantly designed in the form of software components. In principle, however, these components can also be partially implemented in the form of software-supported hardware, for example FPGAs or the like, especially when particularly fast calculations are involved. Likewise, the required interfaces can be implemented as software interfaces, for example when it is only a matter of transferring data from other software components. However, they can also be implemented as hardware interfaces that are controlled by suitable software.

A largely software-based implementation has the advantage that even previously used ascent aids can be retrofitted in a simple manner by means of a software update in order to work in the manner according to the invention. In this respect, the object is also solved by a corresponding computer program product with a computer program, which can be loaded directly into a memory device of an ascent aid controller of an ascent aid, with program sections to execute all steps of the method according to the invention when the program is executed in the ascent aid controller. Such a computer program product may include, in addition to the computer program, additional components, such as documentation and/or additional components, including hardware components, such as hardware keys (dongles, etc.) for use of the software, as appropriate.

A computer-readable medium, for example a memory stick, a hard disk or another transportable or permanently installed data carrier, on which the program sections of the computer program—that can be read in and executed by a computer unit of the ascent aid controller—are stored, can be used for transport to the ascent aid controller and/or for storage on or in the ascent aid controller. The computer unit can, for example, have one or more interacting microprocessors or the like for this purpose.

Further, particularly advantageous embodiments and further implementations of the invention result from the dependent claims as well as the following description, wherein the independent claims of one claim category can also be further characterized analogously to the dependent claims or description parts of another claim category and, in particular, individual features of different embodiments can also be combined to form new embodiments.

Preferably, the input and output of user commands to and from the ascent aid controller are performed using the UI connection interface by means of the voice signal.

Being able to control the ascent aid control bi-directionally by voice in this way means that a pilot can control the ascent aid in normal operation entirely without hands, so that his hands are available in particular for operating or controlling the paraglider. By means of the voice output, visual displays can be avoided, so that the pilot can direct his field of vision independently of any displays and the view is restricted by fewer displays.

Nevertheless, optical output means can of course also be used, such as a wrist display, a smartwatch or a smartphone with a corresponding holder, AR displays (augmented reality) that show the instructions or information in a pair of glasses or in a helmet visor as an overlay in the field of vision, or the like.

In principle, speech recognition can also take place, for example, in a specially designated area within the evaluation unit "spatially" separated from the rest of the evaluation, i.e. certain processes can be outsourced from the evaluation unit and/or run before the evaluation of the evaluation unit.

In order to be able to correctly evaluate user commands, in particular speech signals from the user, the evaluation unit preferably has a speech recognition system for recognizing and evaluating acoustic, e.g. spoken, user commands. In general, speech recognition is understood to mean automatic or machine recognition of spoken language. Speech recognition basically means the ability of a machine or a program to identify spoken words and sentences and to convert them into a machine-readable format. In the context of the invention, speech recognition software that only has a certain predefined vocabulary is sufficient as speech recognition software. However, it then recognizes this predefined vocabulary very reliably even if it is possibly pronounced more "naturally", in particular less clearly.

Preferably, the speech recognition is a speaker-independent speech recognition in which a user is immediately recognised by the speech recognition without a previous training phase.

The input is first recorded with speech recognition software and/or hardware. The speech recognition can then be used to decode the speech signal or the input and transmit it to the evaluation unit for evaluation. If speech recognition is spatially separated within the evaluation unit, the speech signal can then be sent back to the evaluation unit for evaluation or transmitted automatically.

Speech recognition is preferably done with the help of speech recognition libraries such as Snips, Mozilla open source STT (Speech-to-Text), S.E.P.I.A. or the like.

For the detection of the speech signal, auxiliary means are preferably used to suppress the air noise, which is unavoidable during the take-off phase and in flight, or at least to reduce it to such an extent that the transmitted useful signal can be reliably distinguished from the noise signal by the evaluation unit. The auxiliary means are preferably attenuating elements and/or also other common wind shields of a general kind. Further preferably a microphone-like detection device is arranged in the mouth of the pilot. The airflow caused by the environment has virtually no disturbing influence on it.

In order to ensure a particularly simple, uncomplicated and, as far as possible, error-free command structure for the user and the speech recognition, the input or user input, in particular voice input, of a user command is preferably carried out with an activation word, a parameter and optionally a parameter value.

An "activation word" here means a number of predefined words, i.e. at least one word. It precedes any user command given by voice to trigger activation of the ascent aid controller's speech recognition. After triggering, decoding or conversion of the input into a machine-readable format then takes place. The activation words can be predefined in such a way that they are either fixed, can be selected from a list of fixed activation words or can be freely predefined by the user. In this way, at least one activation word can be used to activate certain components of the ascent aid or ascent aid controller in a particularly fast manner without the actual speech recognition having to process and/or interpret the activation word.

A "parameter" here can simply mean a variable defined for the ascent aid controller that has a specific value range. By naming a specific parameter value from the value range for the associated parameter, a predefined state of the ascent aid can be controlled or achieved precisely and unambiguously. For example, a certain percentage of a maximum thrust of the drive can be set or adjusted in this way. Together, such an activation word, a parameter and a corresponding parameter value from the value range of the parameter can be generated by means of the control unit as sufficient control data or control signals.

In order to reduce the necessary computing power of the evaluation unit, the activation word in the user command can preferably be detected or recognized by means of an upstream activation word detector integrated in the evaluation unit for activating the speech recognition. The activation word detector is used to detect an activation word for speech recognition. Immediately after detecting such a word, the activation word detector can activate the speech recognition, which in turn recognizes the command and transmits it to the evaluation unit in a machine-readable format. The computing power required to recognize the activation word can be provided locally and in a resource-saving manner by the activation word detector and the evaluation unit can only be woken up from a "standby mode" when an activation word is recognized. This means that speech recognition does not have to be permanently active or switched on, which in turn saves resources.

Alternatively, a stand-alone external activation word detector can be used. For example, an activation word detector contained in a speech recognition app in a mobile phone or smartphone could be used. Preferably, the speech recognition of a smartphone or a speech recognition with integrated activation word detector on a smartphone could also be used at the same time in order to further reduce the computing power of the evaluation unit. Consequently, the evaluation unit could simply obtain its information for controlling the ascent aid wirelessly or by a cable connection via the mobile device when the pilot uses it as an input means.

The ascent aid control is not limited to a purely acoustic "voice control". If this proves to be advantageous, certain components can also be controlled manually in addition to the acoustic control. This can be implemented e.g. by means of rotary or slide controls, joysticks, or switches e.g. for an emergency shutdown of the engine or for an emergency release of the reserve/rescue parachute. Manual control with a common smartphone would also be possible, for example.

The electric ascent aid for a paraglider with an ascent aid controller is preferably designed in such a way that at least the pilot can separate himself from the electric ascent aid manually or mechanically and save himself in the event of danger, independently of the ascent aid controller. For this purpose, for example, a lock and/or a knot can be released or the like. Particularly preferably, an additional rescue device or emergency parachute can also be released accordingly for the other components of the ascent aid, so that the ascent aid can also be brought to the ground without causing damage if possible. Alternatively, after separation, the ascent aid can hang below the pilot on a rope or similar securing device. Alternatively, an additional user command may be provided by means of which the pilot can electromechanically disconnect from the Climb Assistance.

In order to further increase the pilot's safety and to enable a particularly simple and fast deployment of the reserve/rescue parachute, the ascent aid controller preferably comprises a rescue interface for detecting a user command to deploy the rescue parachute. The deployment of the rescue parachute via the rescue interface preferably also includes the decoupling of the pilot from the ascent aid, in particular the drive, rotor and an accumulator or battery. In this way, in an emergency, e.g. in the event of an engine and/or battery fire, the pilot can be separated from the burning components as simultaneously as possible, or at the same moment, and land safely with the rescue parachute.

By means of voice control, the damaged components can be separated from the pilot even if the pilot is physically impaired, and the release for the pilot's rescue parachute can be triggered.

Preferably, the ascent aid controller may comprise audio and/or visual output means and/or audio and/or manual input means. For example, the output means may comprise a number of displays and/or electronic display units and/or loudspeakers. The input means may be, for example, microphones and/or (touch) displays with face recognition or gesture control.

Preferably, the ascent aid control unit is connected to the drive or motor of the lift, which preferably has at least one rotor, by means of the control interface. This means that the drive can be controlled by voice, e.g. by means of an evaluated and processed user command that has been converted into a control signal for the control unit.

Preferably, the ascent aid controller can be designed to control thrust and/or orientation of the propulsion and/or electronic flight instruments of the electric ascent aid.

As already described above, the thrust can be carried out by specifying the parameter value as a percentage, e.g. as a voice user command. Alternatively, manual control can also be implemented.

The electronic, in particular digital, flight instruments can be, for example, mobile devices, other displays, AR displays or the like, which can, for example, additionally visually display information on the flight altitude or on ascent or descent values or also parameters concerning the flight state. The displays of the flight instruments can preferably be set by voice command, e.g. by choosing between predefined graphic layouts depending on the flight situation.

The alignment of the drive is implemented, for example, by means of a swivel mechanism operated by an electric motor. Preferably, the thrust motor can be switched into a mode for active position control by means of a control signal. In this mode, the swivel mechanism ensures, for example, that the axis of rotation of the rotor is aligned in the direction of flight.

The interfaces mentioned above are preferably designed as wireless interfaces, such as Bluetooth, WLAN, ZigBee, NFC, Wibree or WiMAX in the radio frequency range as well as IrDA and optical directional radio (FSO) in the infrared or optical frequency range.

Alternatively or additionally, the interfaces can also be completely or partially cable-connected. Transmission can also take place here via analogue or digital signal.

BRIEF DESCRIPTION OF THE DRAWINGS

The invention is explained in more detail below with reference to the attached figures using examples of embodiments. In the various figures, identical components are given identical reference numbers. The figures are generally not to scale. They show.

DETAILED DESCRIPTION

Figure 1:
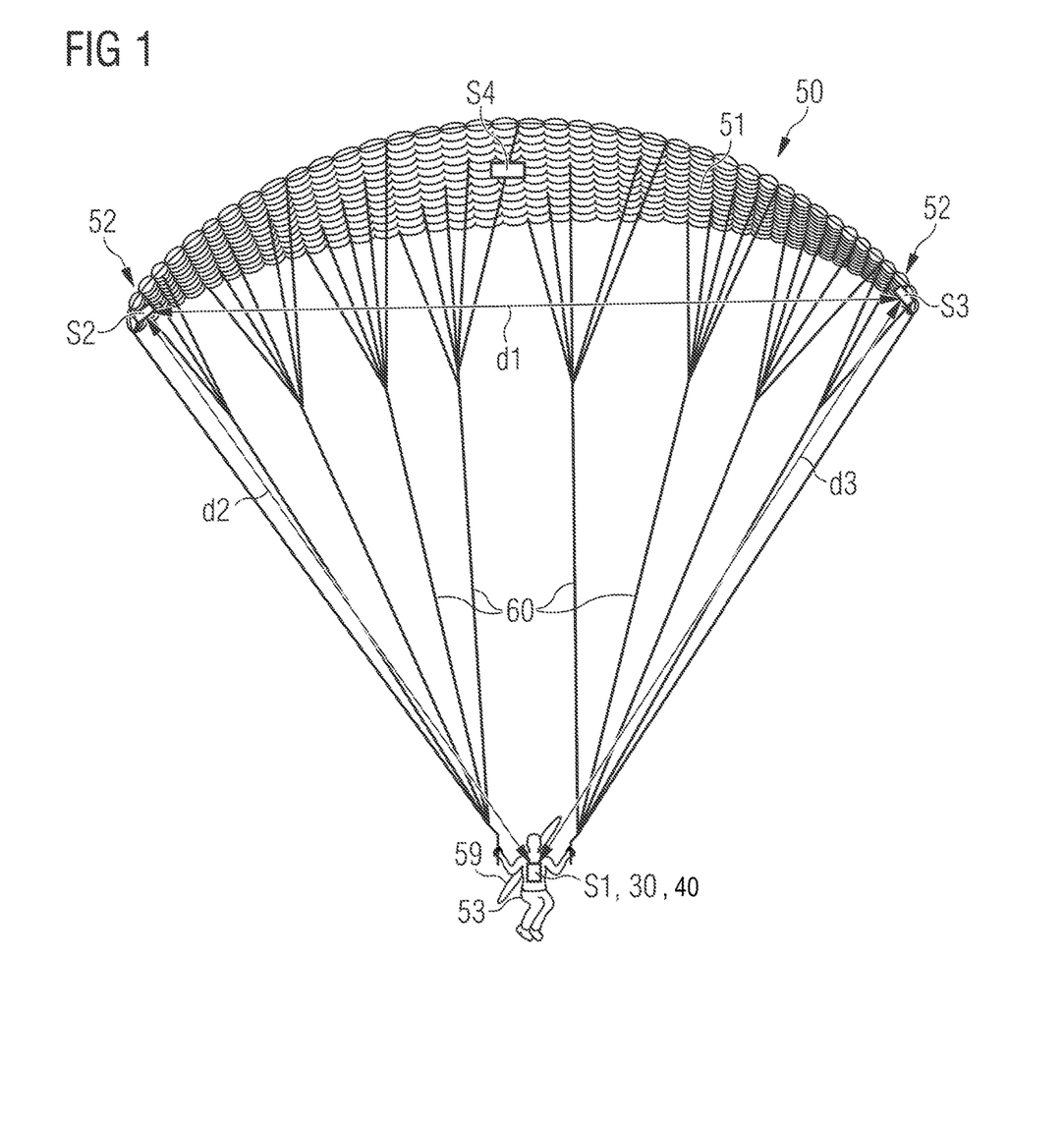
FIG. 1 roughly schematic front view of an embodiment of a paraglider according to the invention with an embodiment of an ascent aid controller according to the invention, FIG. 2 roughly schematic side view of the paraglider from FIG. 1 (without pilot), FIG. 3 schematic block diagram of an embodiment of an ascent aid controller according to the invention with additional sensor arrangement, FIG. 4 schematic flow chart of an embodiment of a method according to the invention for controlling an electric ascent aid.

FIG. 1 shows an exemplary and roughly schematic frontal view of an embodiment of an paraglider 50 according to the invention with an embodiment of an ascent aid controller 40 according to the invention. The paraglider 50 comprises a canopy 51 connected to a load 53 by means of upper and lower line cascades 60. In this embodiment, the load is represented by a pilot 53. The canopy 51 has a substantially elliptical shape with its major axis extending perpendicular to a direction of flight. The canopy 51 has two canopy ends 52 to its lateral sides (left to right as seen by the pilot).

The paraglider 50 comprises a sensor arrangement S1, S2, S3, S4 as well as further components, such as an ascent aid 58, 59, which is explained in detail with reference to FIG. 2, and a central unit 30, which is explained in detail with reference to FIG. 3. In this embodiment, the sensor arrangement S1, S2, S3, S4 has four sensor units S1, S2, S3, S4. A central sensor unit S1 is arranged in the area of the load or pilot 53 and can, for example, be integrated in the central unit 30. A canopy end sensor unit S2, S3 is arranged in the area of each of the canopy ends 52. In this embodiment example, a further canopy center sensor unit S4 is arranged in the area of the center of the canopy.

The canopy end sensor units S2, S3 are arranged at a first distance d1 from each other. One of the canopy end sensor units S2, S3 is arranged at a second distance d2 and d3 respectively from the load. During numerous flight maneuvers and also in dangerous situations the distances d1, d2, d3 change in a characteristic way, so that the flight maneuvers or dangerous situation can be well characterized by means of these distances. To measure the distances d1, d2, d3, the sensor units S1, S2, S3 each have an ultrasonic distance sensor 21, as explained in more detail with reference to FIG. 3.

Figure 2:
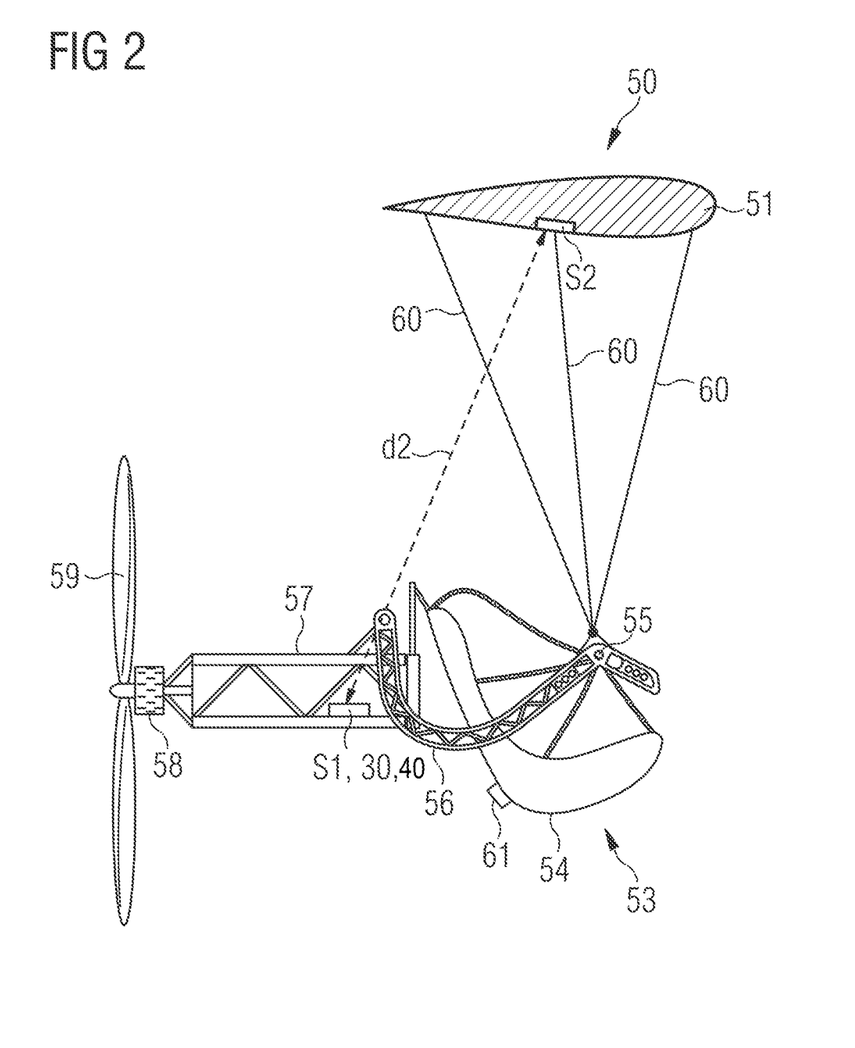

FIG. 2 shows a roughly schematic side view of the paraglider 50 of FIG. 1. The paraglider 50 has an electric ascent aid 58, 59. The electric ascent aid 58, 59 comprises an electric motor 58, which drives a rotor 59 to generate thrust. The electric ascent aid 58, 59 is arranged behind the pilot (not shown here) in the direction of flight and is spaced apart from the pilot by means of a distance element 57 in such a way that the pilot cannot reach a safety area around the rotor 59 with his extremities. The distance element 57 is connected to the lower cascade lines 60 by means of two push rods 56 on both sides of the pilot, each at a suspension point 55, e.g. by means of a carabiner. The weight of the electric ascent aid 58, 59, the distance element 57 as well as the push rods 56 is thus also carried by the paraglider 50 and contributes to the load 53.

The pilot is not shown here, but in normal operation he sits in the harness 54 and is thus also part of the load 53. A rescue parachute 61 is arranged on the harness 54, which comprises a throwing mechanism including a release, which can be controlled by means of a control unit 35, as described in detail with reference to FIG. 3. The motor 58 can also be controlled by means of the control unit 35. The control unit 35 is here an integrated part of the central unit 30. The central unit 30 is arranged at the distance element 57 and thus in the area of the load 53. The central unit 30 comprises the central sensor unit S1 as well as the ascent aid controller 40.

Figure 3:
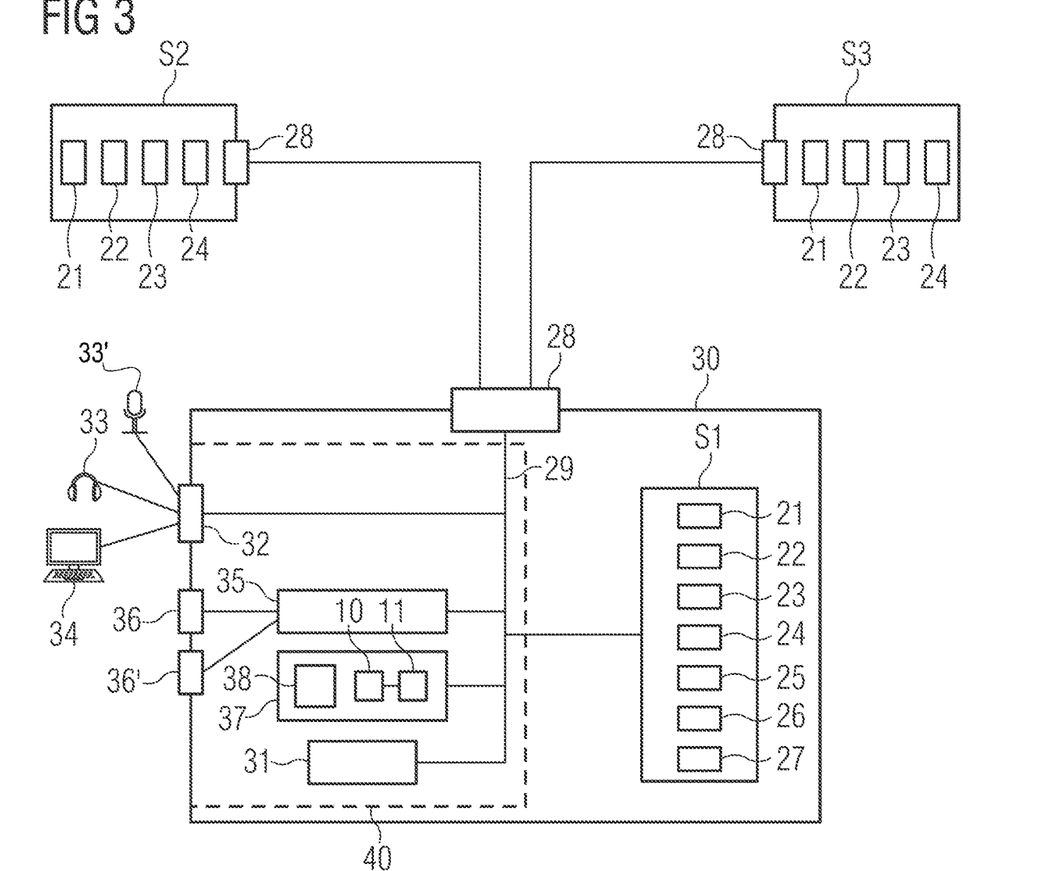

FIG. 3 shows a schematic block diagram of an example of an ascent aid controller 40 according to the invention with a schematic sensor arrangement S1, S2, S3, S4. The ascent aid controller 40 is comprised by the central unit 30, which is arranged in the area of the load 53. Also shown are two peripheral canopy end sensor units S2, S3, which are arranged in the area of the canopy ends 52 of the paraglider 50. In this embodiment example, a central sensor unit S1 is integrated into the central unit 30. The central sensor unit S1 and the two canopy end sensor units S2, S3 form a sensor arrangement S1, S2, S3 with the first and second distances already described with reference to FIG. 1.

The two canopy end sensor units S2, S3 are each connected to the central unit 30 and thus to the ascent aid controller 40 by means of sensor interfaces 28 or flight data interfaces 28. They each have a distance sensor 21, an acceleration sensor 22 and a gyroscope 23. The cropping sensor 22 or the gyroscope 23 is the accelerations in the direction of all axes and can, for example, be designed as a combined IMU. If required, the canopy end sensor units S2, S3 can also have other sensors such as a magnetometer 24 or a dynamic pressure sensor.

Compared to the canopy end sensor units S2, S3, the central sensor unit S1 additionally comprises a barometer 25, a GPS sensor 26 and a LIDAR sensor 27, whose measuring field is aimed at the rotor 59. The LIDAR sensor 27 can thus be used to determine whether an object is entering the safety area of the rotor 59.

The mode of operation of the individual sensors is basically known. They serve the following purposes in detail:

The gyroscopic values of the glider 50 are determined in order to determine the rotational speed about the roll, pitch and yaw axes and to detect any deformation of the wing profile.

The acceleration values of the paraglider 50 are determined in order to be able to derive the movement of the paraglider or individual parts, to determine the horizontal orientation (vector earth gravity) as well as for the absolute long-term correction of the relative gyroscope.

The long-term correction refers to the compensation of the long-term drift of the gyroscope. Since a gyroscope only records relative angular velocities, the absolute starting point must be re-determined at defined intervals. This is done for the roll and pitch axes by means of an adjustment to the (time-averaged) vector of the earth's gravity and for the yaw axis by means of an adjustment to the magnetometric data.

The acceleration values of the pilot or load 53 are determined to establish the "synchronization" between the paraglider and the pilot, as there can be deviations in movement due to the system (pendulum), and to establish the movement vector during a take-off phase.

The gyroscopic data of the pilot or the load 53 are determined for the determination of the thrust vector and for the detection of disturbances during the take-off phase (e.g. tumble of the pilot during take-off).

The magneto-metric data of the paraglider and pilot are used to determine the difference in orientation with respect to the z-axis, since the pilot must turn 180° relative to the paraglider in the final phase of the launch when using a so-called "reverse launch" (paraglider is raised backwards, but must still be launched forwards). It is important to clearly determine the time of the un-twist and the beginning of the acceleration phase. The magneto-metric data from the paraglider are also used for long-term correction of the relative gyroscope.

The relative distance measurement between the canopy endpoints and the pilot using ultrasound is also carried out as a long-term correction of the "integrated acceleration" or to determine speed and position and additionally to determine the line elongation.

Air pressure is measured to determine the internal dynamic pressure of the paraglider and for the detection of thermals (sinking or rising air masses).

The global positioning system (e.g. GPS, Galileo, etc.) is used for flight navigation and flight recording.

All these calculations can be performed before the corresponding results are transmitted to the neural network as input data. Alternatively, the neural network can be trained to directly evaluate the measured sensor data.

The sensor arrangement S1, S2, S3 can, for example, also have one or more further sensor units, such as the canopy center sensor unit S4 (see FIG. 1), which serves as an additional (zero) reference for the long-term correction of the relative gyroscope and, if necessary, also comprises a dynamic pressure sensor in order to enable a holistic detection of the dynamic pressure distribution in the canopy.

In addition to the central sensor unit S1, the central unit 30 comprises the ascent aid controller 40, which is connected to the sensor interface 28 and the central sensor unit S1 via a central bus 29 and receives data sent via it. The central bus 29 thus also acts as an internal flight data interface. The ascent aid controller 40 has an evaluation unit 37, a control unit 35 and a flight recorder 31.

The flight recorder 31 is a writable and readable memory. It can be implemented, for example, as an SD card or micro SD card. Alternatively, it can also be implemented as a permanently installed memory that can be read out via an interface. The flight data, i.e. the measurement data of all sensors as well as determined flight states, are stored on the flight recorder 31.

The flight states are determined in the evaluation unit 37 by means of an analysis unit 38 using a neural network. The measurement data of the sensors and, if applicable, a development of these measurement data over time serve as input vector.

The neural network of the analysis unit 38 has been trained, as already described in detail above, and is therefore trained for the specific task of evaluating the flight situations with regard to safety and/or the canopy with regard to its stability and/or recognizing the momentary maneuvers and/or dangerous situations by analyzing the flight data, i.e. the measurement data of the sensors. In addition, the analysis unit 38 can predict dangerous situations based on the patterns preceding them in the flight data, as also described above.

The ascent aid controller 40 is also connected via a UI connection interface 32 to acoustic output means 33 and visual output means 34, as well as a microphone 33' as acoustic input means for detecting user commands NB. The acoustic output means 33 may comprise, for example, headphones and/or a loudspeaker. The optical output means 34 can be implemented, for example, as a wrist display, on a smartwatch or a smartphone with a corresponding holder. Alternatively or additionally, the optical output means can comprise AR (augmented reality) displays that show the instructions or information, e.g. in a pair of glasses or in a helmet visor as an overlay in the field of view.

A user command NB detected by means of the microphone 33' is routed to the evaluation unit 37 via the central bus 29 and analyzed there. For this purpose, an activation word detector 11 first checks whether the user command NB begins with a predefined activation word AW. In this case, the user command NB is further evaluated by a downstream speech recognition 10 and it is determined whether valid control signals can be detected. In the other case (no valid activation word AW), the user command NB is discarded.

Based on the determined flight state FZ, FZ' or the user command NB, the control unit 35 can, for example, control the motor 58 via a control interface 36. In this way, for example, the thrust can be regulated by means of a user command NB or additional thrust can be provided if the canopy 51 threatens to collapse. Furthermore, an emergency shutdown of the motor 58 can take place if foreign objects enter the safety area of the rotor 59. The control unit 35 can also, for example, control the release for the rescue parachute 61, so that it deploys automatically in an emergency situation or triggered by a user command NB.

Even though the components of the central unit 30 are shown here fully integrated, it is clear that the individual elements of the central unit 30 can also be designed separately at the respective interfaces if this is practical. For example, the central sensor unit S1 or the ascent aid controller 40 can be implemented as separate components. In particular, the ascent aid controller 40 and/or the evaluation unit 37 can be implemented essentially by means of software, as already indicated above, so that with suitable interfaces (e.g. W-LAN, radio connection, etc.) it can also be implemented, for example, on a smartphone or arranged in a ground station. In principle, the interfaces 28, 32, 36, 36' shown and also the connection to the central sensor unit S1 can be implemented both wired and wirelessly (e.g. W-LAN, Bluetooth, Zigbee, radio connection etc.).

Figure 4:
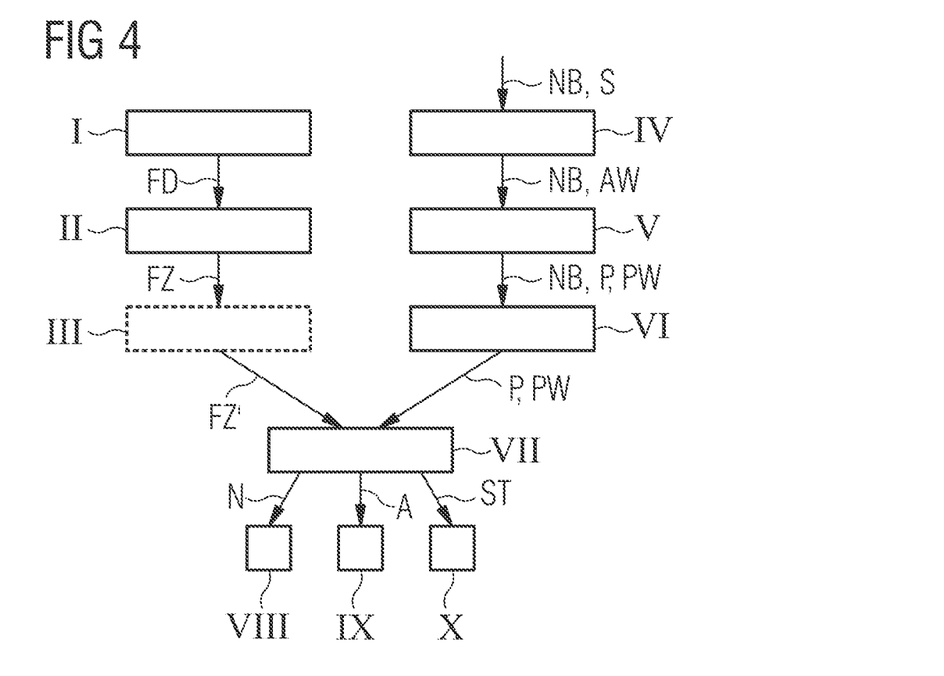

FIG. 4 shows a flow chart of an example of a method according to the invention for determining a flight state of a paraglider 50. In a first step I, measurement data of the sensors are acquired by means of the sensor arrangement S1, S2, S3 and a first distance d1 between the canopy ends 52 as well as the two second distances d2, d3 between a canopy end 52 and the load 53 are determined.

In a second step II, a flight state is determined in the analysis unit 38 of the evaluation unit 37 by means of a neural network using the first distance d1 and/or the second distances d2, d3. I.e. the flight state is evaluated with regard to safety and/or the canopy with regard to its stability and/or the current maneuvers and/or dangerous situations are recognized.

In a further optional step III, the analysis unit 38 makes a prediction about possible dangerous situations using the neural network based on the patterns preceding them in the flight data.

In step IV, a user command NB is detected as a voice signal S by means of the microphone 33' and forwarded to the evaluation unit 37 via the UI connection interface 32. In the evaluation unit 37, in the following step V, the activation word detector 11 first checks whether the user command NB begins with a predefined activation word AW—if not, the user command NB is discarded. Otherwise, the user command NB is further evaluated by the downstream speech recognition 10 in step VI and e.g. assigned to a corresponding variable or several variables. In the process, it is determined, for example, whether the user command NB contains a valid parameter P and a valid parameter value PW.

The parameter P and the parameter value PW are evaluated together with the flight state FZ and/or the prediction FZ' in a further step VII by a simple prioritization logic. Normally, the user commands NB, e.g. concerning the motor control, have priority. The relevant parameter P is therefore set to the associated parameter value PW according to the user command, e.g. the thrust of the engine is set to 50%. However, if e.g. a critical flight situation occurs, the engine can also be switched off or the rescuer triggered only on the basis of the evaluated flight state FZ or the prediction FZ'. In this case, the flight state FZ or the prediction FZ' has priority.

Subsequently to the prioritization logic, in step VIII, the flight condition and/or the prediction can be output as a user signal N by means of the acoustic output means 33 and/or optical output means 34. Furthermore, in step IX, an instruction A can be output via the acoustic output means 33 and/or optical output means 34, with the help of which the current flight state FZ can be improved or the current dangerous situation can be terminated. Furthermore, in step X, based on the flight state FZ and/or the prediction FZ' and/or a user command NB, the motor 58 or the release for the rescue parachute 61 can be controlled by means of the control device.

Finally, it is pointed out once again that the devices described in detail above are merely examples of embodiments which can be modified by the skilled person in various ways without leaving the scope of the invention. Although the voice control has been described in the figures only in connection with an ascent aid positioned at a distance behind the pilot, the voice control can also be used with any other controllable ascent aid or motor for a paraglider. Furthermore, the use of the indefinite articles "a" or "an" does not preclude the features in question from being present more than once. Similarly, the terms "system", "unit" and "arrangement" do not preclude the component in question from consisting of several interacting subcomponents, which may also be spatially distributed.

The invention claimed is:

1. A paraglider controller for controlling a paraglider drive of a paraglider, the paraglider controller comprising:
    a user interface configured to send user commands to a user, the user commands comprising voice signals;
    a flight data interface configured to receive flight data of the paraglider; and
    a processor configured to receive the flight data and output a control signal configured to control the paraglider drive based on the flight data and to output user commands based on the flight data via the user interface.

2. The paraglider controller according to claim 1, wherein the user interface is configured to receive user commands from the user, and
    the processor is configured to receive the user commands and output the control signal configured to control the paraglider drive based on the user commands and the flight data.

3. The paraglider controller according to claim 2, wherein the processor is configured to recognize the user commands.

4. The paraglider controller according to claim 2, wherein the voice signals comprise an activation word, a parameter and a parameter value.

5. The paraglider controller according to claim 1, further comprising a rescue interface configured to release a rescue parachute of the paraglider.

6. The paraglider controller according to claim 1, wherein the processor is configured to control a motor of the paraglider drive including at least one rotor based on the user commands.

7. The paraglider controller according to claim 1, wherein the processor is configured to control at least one of thrust and alignment of the paraglider drive.

8. The paraglider controller according to claim 1, further comprising at least one of acoustic output means and visual output means,
    wherein the user interface comprises acoustic input means.

9. The paraglider controller according to claim 1, further comprising a wireless interface.

10. The paraglider controller according to claim 1,
    wherein the processor is configured to determine a flight state of the paraglider based on the flight data and output a signal based on the flight state.

11. The paraglider controller according to claim 1, wherein the processor is configured to determine the flight state with a trained AI based method.

12. A paraglider comprising:
    a paraglider controller for controlling a paraglider drive of the paraglider, the paraglider controller comprising:
    a user interface configured to send user commands to a user, the user commands comprising voice signals;
    a flight data interface configured to receive flight data of the paraglider; and
    a processor configured to receive the flight data and output a control signal configured to control the paraglider drive based on the flight data and to output the user commands based on the flight data via the user interface.

13. A method for controlling a paraglider drive of a paraglider, the method comprising:
    sending user commands to a user, the user commands comprising voice signals;
    receiving flight data of the paraglider; and
    outputting a control signal configured to control the paraglider drive based on the flight data and outputting user commands to the user based on the flight data.

14. A computer-readable medium having stored thereon program sections readable and executable by a computer unit to perform all of the steps of the method according to claim 13 when the program sections are executed by the computer unit.

* * * * *